United States Patent [19]

Carlen

[11] 4,232,255
[45] Nov. 4, 1980

[54] DELIVERY CONTROL SYSTEM FOR VEHICLE-MOUNTED SPREADER

[76] Inventor: Eric T. Carlen, R.R. #1, Wirtz, Va. 24184

[21] Appl. No.: 957,729

[22] Filed: Nov. 6, 1978

[51] Int. Cl.³ .............................................. H02P 5/20
[52] U.S. Cl. .................................. 318/143; 318/158; 239/155; 222/63; 222/627
[58] Field of Search ............... 318/141, 142, 143, 146, 318/156, 158, 445, 452, 454, 461; 322/22, 23, 24, 36, 37; 239/62, 155; 222/63, 626, 627

[56] References Cited

U.S. PATENT DOCUMENTS

| | | | |
|---|---|---|---|
| 3,441,039 | 4/1969 | Rawson | 239/155 X |
| 3,560,822 | 2/1971 | Loshbough | 318/158 |
| 3,776,431 | 12/1973 | Riley | 222/627 |
| 3,929,292 | 12/1975 | Phillips | 222/627 X |
| 4,132,941 | 1/1979 | Sousek et al. | 239/155 X |

Primary Examiner—J. V. Truhe
Assistant Examiner—J. Redman

[57] ABSTRACT

A control system for regulating the speed of a truck-mounted material conveyor includes a direct current drive motor and a truck-driven shunt generator for providing power to the motor. A control circuit has a reference input representing desired delivery rates in material weight per unit of distance and a truck speed input. A multiplier circuit converts the inputs to a delivery rate in terms of material weight per unit of time at the current truck road speed. Generator and conveyor speed feedback loops are provided to maintain a desired conveyor speed despite variations in truck engine speed or slippage at the conveyor.

7 Claims, 2 Drawing Figures

DELIVERY CONTROL SYSTEM FOR VEHICLE-MOUNTED SPREADER

BACKGROUND OF THE INVENTION

The present invention relates to material handling and more particularly to a delivery control system for a vehicle-mounted spreader.

In color climates it is a common practice to spread sand, salt/sand mixtures or heat-producing bulk chemicals onto icy or snowpacked streets and highways. Spreading trucks used for this task generally include a bulk material storage hopper, a belt or screw type conveyor for delivering the bulk material to be spread from the storage hopper to the rear of the truck and a spinner for spreading the delivered material over a path of predetermined width. The amount of bulk material spread is, generally speaking, a function of the conveyor speed. The spinner speed, which typically remains constant, controls only the width of the covered path.

Ideally, the bulk material is to be spread at a uniform rate since too much material is wasteful while too little material does not substantially improve roadway conditions. The latter situation is particularly dangerous since a driver who has been lulled into complacency by sections of properly treated roadway may not be alert enough to avoid an accident when an inadequately treated section of roadway is unexpectedly encountered.

Hydraulic control systems have been developed to control the delivery of bulk materials. A typical hydraulic control system includes a servo controlled variable volume pump driven by the truck engine. The hydraulic pump feeds a hydraulic motor which drives the conveyor at a reasonably constant rate. The conveyor speed is fed back in a closed loop around the pump/motor combination to regulate out disturbances that might otherwise be caused by instantaneous variations in truck engine speed. The intended result is to control the conveyor speed to produce a desired material spread rate in material weight per unit of time; for example, in pounds per hour.

An immediately apparent drawback to this system is that the desired spread rate is based on an assumption that the spreader truck can maintain a desired constant speed, an objective which can rarely be met in view of the conditions under which spreader trucks operate. A truck driver who travels at a faster than assumed speed must either change the reference input to the hydraulic system or ignore the fact that too little material is being spread. The converse is true. A slower-than-assumed truck will spread too much material unless the driver makes the proper adjustments. Truck speed seldom can be kept constant and a conscientious driver will be forced to make adjustments constantly. Even if the driver is willing to do this, the results are seldom as uniform as might be desired.

Hydraulic control systems are believed to be available in which road speed is taken into account by using a speed transducer to adjust a flow valve at the pump output. The response time of such a system may be relatively slow since the hydraulic motor will require some time to respond to changes in input flow.

Hydraulic spreader control systems have other disadvantages. The components are costly by themselves. The systems are costly to install and, because of the corrosive nature of many of the bulk materials being spread, costly to maintain.

It has been suggested that a hydraulic control system might be replaced by an electric control system including a solid state inverter which would convert 12 volt battery power to a controllable d.c. voltage to be supplied to a direct current drive motor for a conveyor.

A primary drawback to such a system is cost. Because of battery drain, a special heavy duty truck generator is necessary, as is a heavy duty battery. A solid state inverter is also relatively expensive. The accumulated costs of these components is undesirably high. Moreover, the proposed inverter is a constant speed system which does not take variations in road speed into account.

SUMMARY OF THE INVENTION

The present invention is an electrical control system for regulating the rate of delivery of bulk material by a vehicle having a supply hopper and a conveyor device communicating with the hopper. The present system is less expensive to build, install and maintain than known prior art systems and is also more responsive. Road speed is automatically taken into account while any engine speed variation is compensated for with minimal delay.

The system includes a conveyor drive system with a direct current motor and an engine-driven generator for providing variable power for the motor. A voltage feedback loop is connected at the generator output. First and second transducers provide first and second voltages proportional to the conveyor speed and the vehicle road speed, respectively, while a manually adjustable means provides a reference input voltage related to a desired material spread rate in terms of material weight per unit of distance. A controller circuit operates on the transducer voltages from the generator in a way which causes the direct current motor to drive the conveyor at a speed directly related to road speed but independent of variations in engine speed.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DESCRIPTION OF PREFERRED EMBODIMENT

Figure 1:
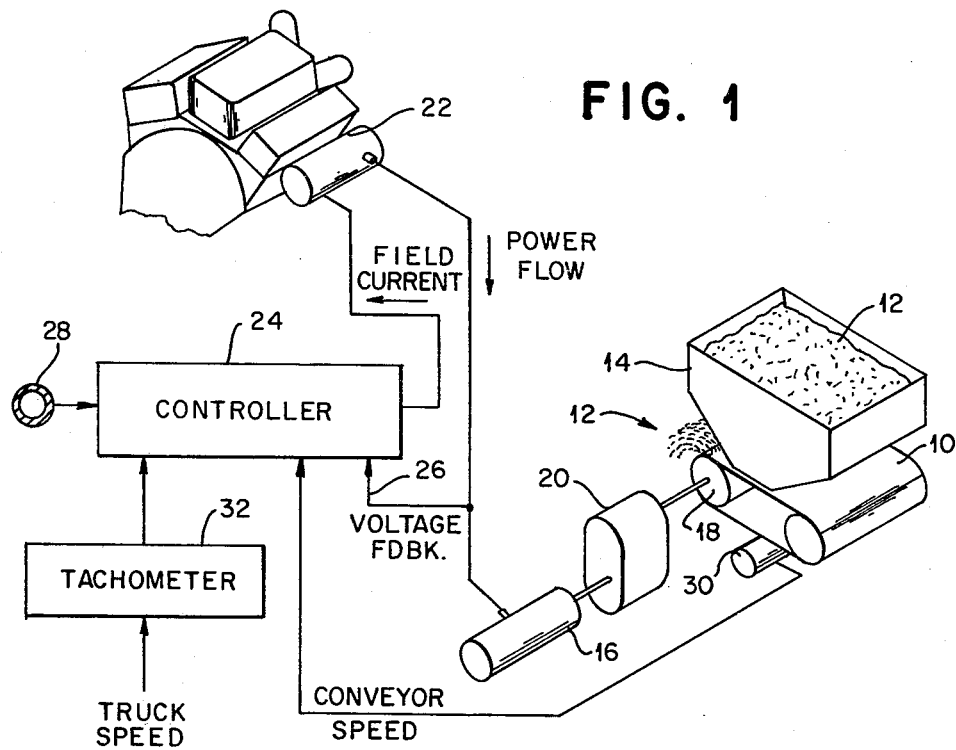
FIG. 1 is a schematic diagram of a delivery control system constructed in accordance with the present invention.

Referring to FIG. 1, a delivery control system constructed in accordance with the present invention can control the linear speed of a belt-type conveyor 10 which receives bulk material 12 gravity fed from a conventional truck-mounted storage hopper 14. The conveyor is driven by a direct current drive motor 16 coupled to a conveyor drive roller 18 through a speed-reducing gear system 20.

A belt-driven generator 22 on the truck engine provides a controlled voltage for the drive motor 16 to enable that motor to drive the conveyor at a speed proportional to the road speed of the truck. In a preferred embodiment of the invention, the field voltage of motor 16 is fixed while the armature voltage is varied to control the motor speed. Generator 22 is preferably a conventional direct current shunt generator manufactured for heavy duty automotive use. Heavy duty truck engines normally include a mounting bracket for an auxiliary generator, such as generator 22.

The magnitude of the direct current voltage produced by generator 22 is a function of its field current. The magnitude of the field current is, in turn, regulated by controller 24 having a negative feedback 26 from the armature of generator 22 and an input from a reference voltage means 28 which preferably comprises a manually-adjustable potentiometer which an operator can use to establish a voltage representing a desired material delivery rate in terms of bulk material weight per unit of distance. In the English system of measure, the potentiometer would probably be calibrated in pounds of material per mile of roadway.

Other inputs to controller 24 include a first input voltage generated by a first transducer or tachometer 30 mechanically driven by conveyor 10. A second speed-related input to controller 24 is provided by a second transducer or tachometer 32 providing a feedback voltage proportional to the instantaneous road speed of the truck. Road speed is not to be confused with engine speed. Road speed can normally be thought of as a function of engine speed with the instantaneous ratio between the two being a function of transmission gear ratios. However, because of clutch slippage (whether operator-caused or not) and engine speed fluctuations during shifting of gears, the normal engine/road speed ratios may not exist for significant periods of time. For that reason, tachometer 32 is driven from a truck axle or drive shaft rather than from the engine.

The system described above operates in the following manner to regulate the instantaneous speed of conveyor 10 to cause the bulk material to be delivered at a predetermined rate in pounds per mile regardless of variations in truck road speed or engine speed.

When the operator has selected the appropriate weight/unit of distance setting on potentiometer 28, controller 24 converts the reference input to a weight/unit of time signal by combining the input from potentiometer 28 with the road speed input from tachometer 32. The weight/unit of time signal resulting from this combination establishes a base level signal which would cause the appropriate drive voltage to be applied to generator 22. Assuming the engine speed remains constant and there is no slippage at conveyor 10, the base level voltage would cause drive motor 16 to drive conveyor 10 at the speed which would result in dispensing of the desired weight of bulk materal per unit of distance.

For reasons given earlier, engine speed cannot be considered constant. Negative feedback voltage provided by means of line 26 results in compensation for variations in engine speed. Generator 22 is able to produce an output voltage which depends on the base level signal but is independent of engine speed variations.

The conveyor speed feedback signal provided by tachometer 30 similarly compensates for conveyor speed variations resulting from slippage at the output of drive motor 16.

Figure 2:
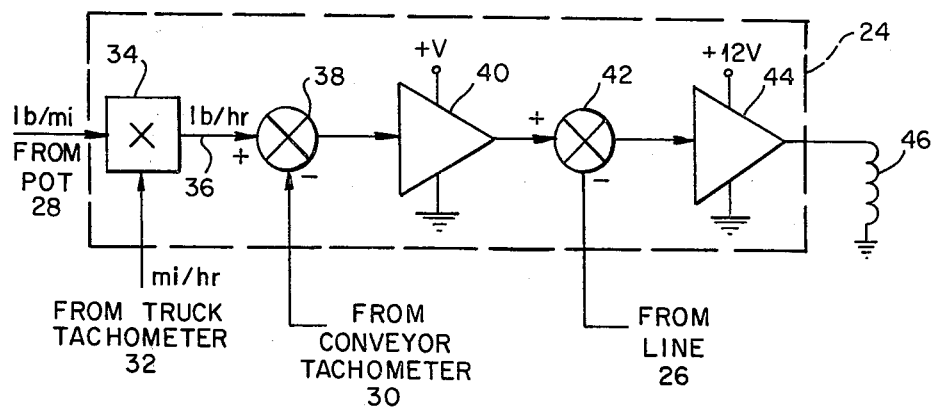
FIG. 2 is a schematic diagram including details of the controller 24 in FIG. 1.

FIG. 2 illustrates controller 24 in greater detail. The reference voltage established by potentiometer 28 and the road speed-proportional voltage generated by tachometer 32 are combined in a conventional multiplier circuit 34. The resulting output signal on line 36 is a reference voltage proportional to the desired material delivery rate in pounds per hour at the truck's current road speed. The reference signal on line 36 is applied to a first input of a summing junction 38 having a second subtractive conveyor speed feedback signal provided by tachometer 30. The output of summing junction 38 is an error voltage proportional to the instantaneous difference between the reference or desired conveyor speed and the actual conveyor speed.

The error voltage is amplified by a speed loop amplifier 40 before being applied to one input of a second summing junction 42. A second subtractive input to summing junction 42 is provided by voltage feedback line 26 from the output of generator 22. The output of summing junction 42 is an error voltage proportional to the cumulative effects of conveyor speed error and generator output error, the latter resulting from variations in engine speed. This cumulative error voltage is used to drive a voltage loop amplifier 44 which provides the field current for a field winding 46 in generator 22.

It will be noted that the system has two feedback loops for maintaining the conveyor speed at a value determined by the setting of potentiometer 28 and the current road speed of the truck. The outer or speed loop includes tachometer 30. The inner or voltage loop includes line 26. The response time of the inner or voltage loop is relatively short since only the time constant of the generator 22 is involved. The response time of the outer loop is greater because of the cumulative time constants of the generator 22, motor 16 and tachometer 30. The presence of the inner loop will greatly improve the regulation of the system since generator output variations due to engine speed variations are quickly compensated for through the inner loop. Without the inner loop, these variations would have to be reflected through the slower outer loop before compensation would occur.

While there has been described what is considered to be a preferred embodiment of the invention, variations and modifications therein will occur to those skilled in the art when they become acquainted with the basic concepts of the invention. Therefore, it is intended that the appended claims shall be construed to include the preferred embodiment and all variations and modifications that fall within the true spirit and scope of the invention.

Having thus described my invention, what I claim as new and desire to secure by Letters Patent is:

1. An electrical control system for regulating the rate of delivery of bulk material by a moving vehicle having a supply hopper and a conveyor device communicating with the hopper, said system comprising:

a conveyor drive system including a direct current drive motor;

an electrical generator for providing electrical power to said direct current motor, said generator being mechanically driven by the vehicle engine and having a negative feedback loop connected at its output;

a first transducer for providing a first voltage proportional to the conveyor speed;

a second transducer for providing a second voltage proportional to the vehicle speed;

manually adjustable means for providing a reference voltage representative of the desired material delivery rate in weight of material per unit of distance;

a controller connected to said first transducer, said second transducer, said manually adjustable means and the negative feedback loop of said electrical generator and responsive to the voltages produced thereby to control the generator field current to cause said drive motor to drive the conveyor at the speed required for the desired material delivery rate.

2. An electrical control system as defined in claim 1 wherein said electrical generator comprises a direct current shunt generator.

3. An electrical control system as defined in claim 2 wherein said conveyor drive system further includes a speed-reducing gear system interposed between said direct current drive motor and said drive conveyor.

4. An electrical control system as defined in claim 3 wherein said controller further comprises:
- a multiplier circuit having a first input from said manually adjustable means and a second input from said second transducer;
- a first summing junction having a first input from said multiplier circuit and a second input from said first transducer; and
- a second summing junction having a first input from said first summing junction and a second input from the negative feedback loop of said generator, the output of said second summing junction being connected in series with the field winding of said generator.

5. An electrical control system as defined in claim 4 further including a speed loop amplifier connected in series between the output of said first summing junction and the input of said second summing junction.

6. An electrical control system as defined in claim 5 further including a voltage loop amplifier connected in series between the output of said second summing junction and the field winding of said generator.

7. An electrical control system as defined in claim 3 wherein said controller further comprises:
- multiplier means for multiplying the reference voltage provided by said manually adjustable means times the vehicle speed-related voltage provided by said second transducer to derive a reference voltage proportional to the desired material delivery rate in terms of material weight per unit of time;
- a first summing junction having a first input for receiving the reference voltage provided by said multiplier means and a second input for receiving a feedback voltage from said first transducer representative of the actual material delivery rate in terms of material weight per unit of time, the output of said first summing junction being an error voltage proportional to the difference between the desired and the actual delivery rates; and
- a second summing junction having a first input for receiving a voltage proportional to said error voltage and a second input for receiving a feedback voltage from said generator, the output of said second summing junction being applied to the field winding of said generator to cause said generator to produce a desired voltage independent of the actual speed of the vehicle engine.

* * * * *